United States Patent [19]

Burns

[11] 4,303,035

[45] Dec. 1, 1981

[54] METHOD OF SUPPRESSING RADIATION FROM SHIP STACK GASES

[75] Inventor: Robert H. Burns, Arnold, Md.

[73] Assignee: The United States of America as represented by the Secretary of the Navy, Washington, D.C.

[21] Appl. No.: 27,709

[22] Filed: Apr. 3, 1979

[51] Int. Cl.³ .............................................. B63B 15/00
[52] U.S. Cl. ................................................... 114/187
[58] Field of Search ...................... 60/39.05, 310, 317, 60/318, 320; 110/215, 345; 114/187

[56] References Cited

U.S. PATENT DOCUMENTS 576,432  2/1867  Bush ..................................... 114/187
3,485,040  12/1969  Niskanen ............................... 60/310

Primary Examiner—Stephen C. Bentley
Attorney, Agent, or Firm—Robert F. Beers; William T. Ellis; Kenneth E. Walden

[57] ABSTRACT

A method of reducing the temperature of hot combustion gases discharging from atop a ship stack and at least partially suppressing infrared radiation thereof by the steps of preheating water to near 100° C. and spraying it into the hot gases at near the base of the stack. Hot water is used because it more readily vaporizes and absorbs the latent heat of vaporization from the gases and exits the stack as a vapor, the radiation from which is more readily absorbed by water vapor, always present above the sea, than is radiation from water droplets.

6 Claims, 2 Drawing Figures

METHOD OF SUPPRESSING RADIATION FROM SHIP STACK GASES

The invention described herein may be manufactured and used by or for the Government of the United States of America for governmental purposes without the payment of any royalties thereon or therefor.

BACKGROUND OF THE INVENTION

1. Field of the Invention

The invention relates to the field of reducing the temperature of combustion gases discharging to the atmosphere above a ship stack in a manner for attenuating the heat radiation thereof.

2. Brief Description of the Prior Art

Methods are known in the prior art to suppress infrared radiation of exposed hot metal parts and from hot gas plumes from jet engines to reduce their vulnerability to missile attack. Such is disclosed in U.S. Pat. No. 4,095,417 where ejector vanes introduce cooling ambient air into the hot engine exhaust and hide hot metal parts. U.S. Pat. No. 3,712,054 discloses a method of attenuating a heat radiation field of a heat exhausting vehicle by injecting fluidized foreign powdered material in the vicinity of heat radiation. It is further known to reduce stack temperatures on Navy ships by aspirating cooling air into the stack, and by spraying sea water into the presence of the hot exhaust gases for suppressing infrared radiation. Even to the present, it has always been ambient water at the temperature of the surroundings, which was sprayed into the stack. The idea was that the colder the water the better, because of the additional heat water at a lower temperature was capable of absorbing in its transition from water to vapor. The shortcoming of this reasoning is that the water would often enter the atmosphere from the stack incompletely vaporized in the form of droplets, and as such would radiate as a blackbody suspectable to detection. Stacks on modern ships are not tall enough to permit cold water to completely vaporize by the time it leaves the stack.

SUMMARY OF THE INVENTION

The invention is directed to a method of reducing infrared radiation from hot combustion exhaust gases discharging to the atmosphere from atop a ship stack. Already known in the art is the injection of ambient water in the form of spray into hot exhaust gases passing through a stack for absorbing heat and lowering temperature of the gases prior to their discharge to the atmosphere. One of the problems encountered by injecting ambient water into exhaust gases is that modern ship design dictates short stacks. Thus the travel time of gases passing therethrough is consequently shorter and may not allow sufficient time for the water, even when injected as a spray, to have completely vaporized at its discharge to the atmosphere. Unvaporized water in the form of droplets discharging from a stack are excellent radiating bodies. Past thinking has been that the colder the water sprayed into the stack, the better because more heat would be absorbed from the exhaust gases. The disadvantage of cold water spray, particularly into short stacks, is that there is not sufficient time for its complete vaporization by the time the gases reach the atmosphere. Therefore, water droplets are present. What was not thought of prior to the present invention was to preheat the water to near its boiling point (100° C.) prior to spraying it into the stack in the presence of hot gases. The heat absorbed by water for example in passing from 30° C. to 100° C. is relatively minor compared to the heat that water at 100° C. absorbs in passing to vapor, i.e., the heat of vaporization. However, if the water is preheated in coils located upstream of where it is sprayed into the stack, even this limited amount of heat is partially absorbed. The idea of spraying preheated water, instead of cold water into a stack carrying hot exhaust gases for cooling the stack gases and for complete vaporization of itself to reduce infrared radiation is contrary to past thinking, and forms the basis of this invention.

Therefore, an object of the present invention is to suppress infrared radiation, at least in certain wavelengths, in the effluents discharging from atop a ship stack.

Another object of the present invention is to suppress infrared radiation in stack effluent by spraying preheated water into the stack for ready absorption of the heat of vaporization and discharge as vapor from the stack, the radiation of which is readily absorbed by water vapor in the atmosphere.

DESCRIPTION OF THE PREFERRED EMBODIMENT

Figure 1:
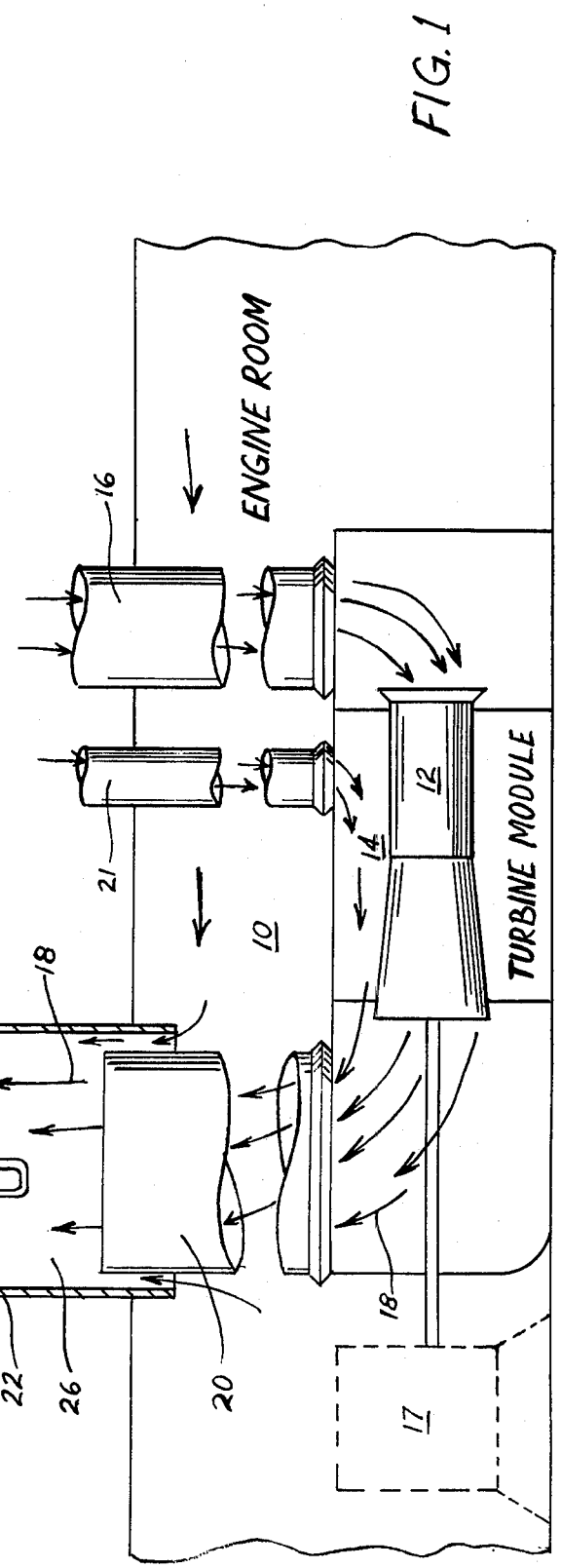
FIG. 1 is a view in elevation representing a typical ship engine room and stack in which the present invention may be used.

FIG. 1 of the drawing illustrates a ship environment in which the present invention may be used. It shows in elevation an engine room 10 where turbine 12, housed in module 14, is connected through a shaft to drive gearing in box 17, outlined in phantom. Turbine 12 receives combustion air through duct 16 and exhausts hot gases 18 through duct 20 into stack 22, from which they are discharged to the atmosphere. The turbine module is continually ventilated by air supplied through duct 21. This air is drawn into and discharged along with the turbine gases. Fresh air is caused to flow through the engine room by being continually aspirated into stack 22 through annular opening 26 about the top of exhaust duct 20 where it protrudes into the ship stack.

The invention has utility in treating hot exhaust gases from other propulsion means such as diesel engine, gas or oil fired boilers.

Water is sprayed into the stack only in emergencies for relatively short periods of time during impending attack by heat seeking missiles. Preheated water is sprayed under pressure through nozzle 30 into stack 22 as far as practical from the top of the stack to allow maximum time for complete vaporization of the water. The water to be sprayed through nozzle 30 can be supplied from any of numerous sources aboard ship. It may be plain or treated water, or even saltwater, since the quantity used is limited. As shown in FIG. 1, a plurality of coils 32 are located near the base of stack 22 in the exhaust gases for carrying the water to be preheated to near 100° C. Coils 32, as illustrated, are wound in a direction so that flow of water therethrough is counter to the direction of exhaust gas flow for more efficient heat transfer. The pipe carrying the heated water is then conducted downstream of the gas flow to head or nozzle 30 above the coils from which it is sprayed into the presence of the rising hot exhaust gases. As illustrated, water, either fresh or salt, is carried into coils 32 through line 34. This water may be preheated by arrangements other than as shown, for example, it may be heated through a heat exchanger located entirely outside the stack, or heat may be supplied from main or auxiliary equipment. Hot water may be bled from boilers to preheat the spray water, or the boiler water may be sprayed directly, since the quantity consumed will be very limited. Preferably, the water is preheated to a temperature at around or just under 100° C. at atmospheric pressure before being sprayed, atomized, or otherwise introduced into the hot exhaust gases. If the coil arrangement as illustrated in FIG. 1 is employed, the tubing is of such a length and so arranged in the stack, depending on stack size and legnth, gas temperatures, and velocity that the water or other fluid is brought to very near 100° C. by the time it reaches the spray nozzle. Thus, when the liquid is sprayed into the hot gases it rapidly evaporates, claiming its great heat of vaporization from the surroundings and quickly cooling the stack gases and walls in a short downstream distance.

When water is vaporized, there is no change in temperature, but there is a definite transfer of heat from the surroundings to the water. The amount of heat absorbed by water in being raised from seawater temperature (assumed at 5° C.) to 100° C. is relatively low when compared with the heat absorbed when it passes from water at 100° C. to vapor at the same temperature. Thus, it will be apparent that the major heat absorption by water is not from ambient to 100° C. but from 100° C. to vaporization. However, according to the arrangement shown in FIG. 1 some heat is absorbed from the hot gases in raising the water in coils 32 from ambient seawater temperature to 100° C.

Each gram of water sprayed into a stream of hot gases extracts about 4.2 joules of heat from the gas for every 1° C. that gram of water rises in temperature. Each gram of water, already at 100° C. in a stream of hot gases, in passing to vapor removes about 2,257 joules of heat from the gas. Therefore, when the contact time between hot gases and water aerosol spray is short, much more cooling is gained if the droplets are already at near 100° C. when they are injected into the hot gas stream.

The term water as used in defining this invention includes water not only of the type and from the sources mentioned in this specification, but includes, as well, water which may contain impurities, or to which chemicals have been added, as for example to inhibit corrosion or to prevent freezing. However, such impurities or inclusions must not be of such concentration or extent which would interfere with the intended operation.

Previous cold water spray systems for ship stacks either (1) needed a long mixing time with the stack gases, thus requiring tall stacks (not now acceptable on combat ships), or (2) resulted in hot water droplets emerging from atop the stack as strong sources of infrared radiation. By being preheated to near 100° C., the water upon being sprayed or otherwise introduced into the stack hot combustion gases vaporizes more rapidly and the vapor emerging from the stack is not a significant infrared radiator because water molecules in the atmosphere absorb water vapor radiation more rapidly than they absorb droplet or liquid radiation. While the water is preferably preheated to around 100° C., preheating to some lower temperature would be beneficial, but not as effective.

Solids and liquids emit infrared radiation in a continuous band across the spectrum. The spectral width is determined by the emitter's temperature. The intensity of the radiation is determined by the temperature and surface emissivity of the emitter. For instance, a diffuse blackbody, such as a droplet of water, is an excellent infrared emitter. This is illustrated by the upper curved line on the chart in FIG. 2. Gases emit infrared radiation only at specific wavelengths (lines). The intensity of these emission lines cannot exceed that of a blackboy at the same temperature. This radiation is illustrated by the lower curves on the chart in FIG. 2.

Figure 2:
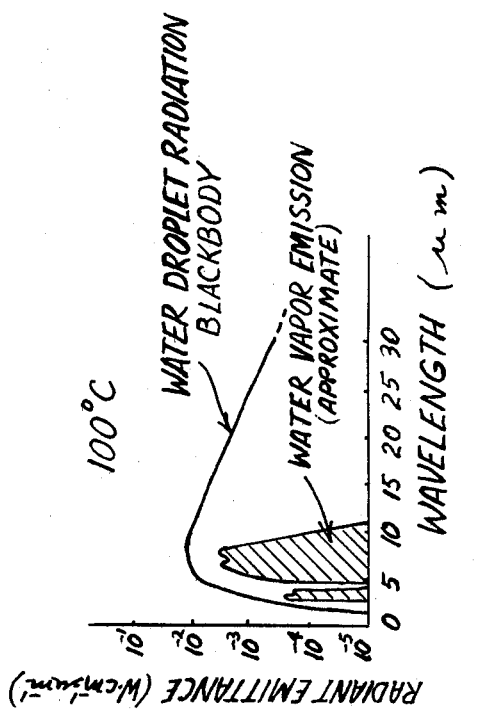
FIG. 2 is a graph illustrating radiation of a blackbody versus water vapor.

Molecules in the atmosphere absorb radiation at the same specific wavelengths (lines) at which they emit. Since there is always high humidity just above the surface of the sea, there is an abundance of water vapor molecules to absorb any radiation lines emitted by other water vapor molecules. The transmission of most water vapor lines is completed attenuated within several meters. Thus, a marine atmosphere more rapidly attenuates radiation from water vapor than from exhaust effluents containing water droplets. Infrared emission from water vapor at 100° C. is very much less than the infrared emission from water droplets at 100° C. Therefore, as illustrated in FIG. 2, the infrared emission from a vapor will never exceed that of a blackbody at the same temperature, and much will be absorbed by the surrounding atmosphere. One way of illustrating what is gained by the complete vaporization of the water can be seen by comparing the difference in areas beneath the blackbody curve and the water vapor emission lines shown in FIG. 2.

While the invention has been disclosed in some detail as to structure and operation, it will be apparent that various modifications and changes can be made thereto without departing from the spirit of the invention, which is limited only by the scope of the appended claims.

What is claimed is:

1. A method of reducing infrared radiation of combustion effluents from atop a ship's stack by:
   spraying water preheated to near 100° C. into the stack;
   whereby water droplets, already at a temperature for quickly absorbing their heat of vaporization from their surroundings, become vapor and the effluent discharging from atop the stack, in addition to having an overall temperature reduction, includes vapor whose infrared radiation is readily absorbed by like vapors in the atmosphere always present in the atmosphere above seawater.

2. The invention as defined in claim 1 wherein the water is sprayed into the stack at a location remote from its top.

3. The invention as defined in claim 1 wherein the water is preheated by the stack gases at a location upstream of where the heated water is sprayed into the stack.

4. The invention as defined in claim 2 wherein the water is preheated in a heat exchanger in the stack located upstream of where the heated water is sprayed into the stack.

5. A method of reducing infrared radiation of combustion gases from atop a ship's exhaust stack comprising the steps of:
   preheating water to near 100° C.;

spraying the preheated water for short periods of time into hot gases in the stack for quick absorption of its heat of vaporization and transformation from droplets to vapor;

whereby the effluent discharging to the atmosphere has its overall temperature reduced and radiation from the vapors thereof is readily absorbed by vapors always present in the atmosphere above water.

6. In the method of spraying water into the presence of hot combustion gases prior to their discharge from atop a ship stack for reducing temperature and infrared radiation in the atmosphere, the improvement comprising:

preheating the water to near 100° C.; and spraying the preheated water into the hot combustion gases in the stack for short periods of time.

* * * * *